April 17, 1962 W. THAR, JR 3,029,663
CLAMP FOR HOLDING CHAIN SAWS FOR SHARPENING
Filed March 11, 1960
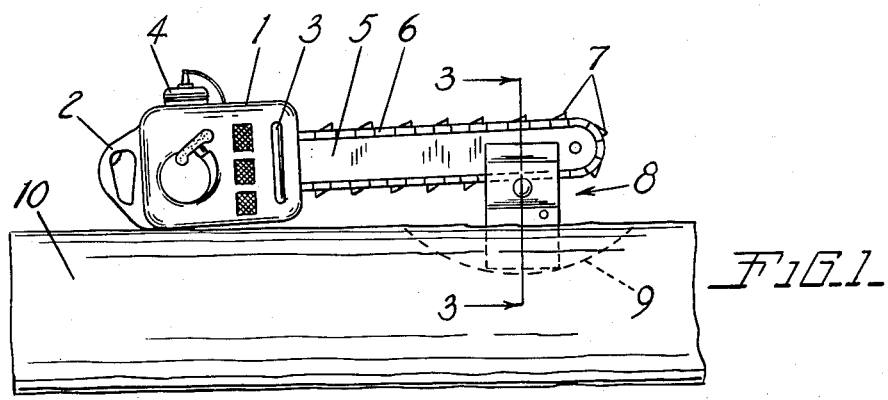
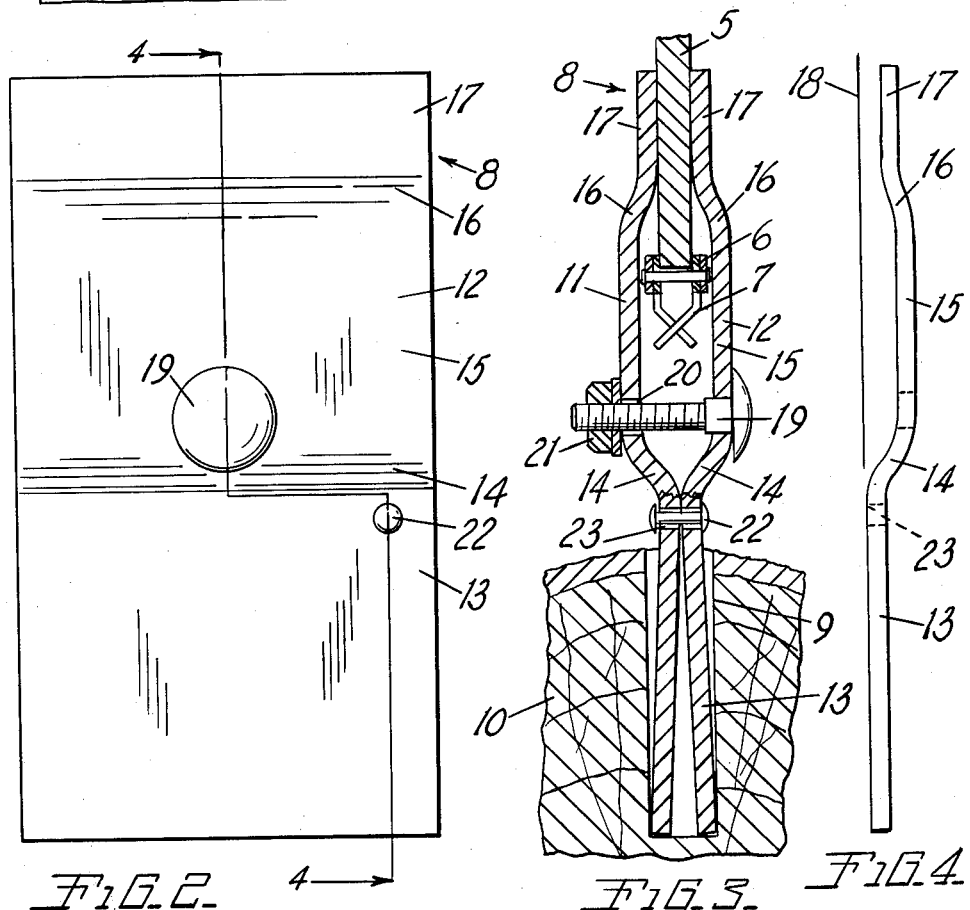
INVENTOR.
William Thar Jr.
BY
ATTORNEY.

United States Patent Office 3,029,663
Patented Apr. 17, 1962

3,029,663
CLAMP FOR HOLDING CHAIN SAWS FOR SHARPENING
William Thar, Jr., 845 Warwick, Benton Harbor, Mich.
Filed Mar. 11, 1960, Ser. No. 14,350
8 Claims. (Cl. 76—78)

This invention relates to improvements in clamp for holding chain saws for sharpening. The principal objects of this invention are:

First, to provide a simple and inexpensive clamp for rigidly supporting the blade of a power driven chain saw so that the teeth of the saw may be conveniently sharpened.

Second, to provide a saw supporting clamp which is easily engaged with a log or stump for supporting a chain saw for sharpening at the work site of lumbering operations.

Third, to provide a saw supporting clamp which is small enough to be conveniently carried in the pocket of a lumberman and applied to the saw on the job.

Fourth, to provide a simple clamp in which tightening of the saw engaging jaws thereon simultaneously spreads support engaging portions of the clamp to firmly secure the clamp to a stump or other rigid support.

Other objects and advantages of the invention will be apparent from a consideration of the following description and claims. The drawings, of which there is one sheet, illustrate a highly practical form of the saw clamp.

FIG. 1 is a side elevational view of the clamp of the invention operatively associated with a power driven chain saw to support the saw on a log for convenient sharpening of the saw teeth.

FIG. 2 is an enlarged side elevational view of the clamp.

FIG. 3 is a fragmentary transverse cross sectional view taken along the plane of the broken line 3—3 in FIGS. 1 and 2.

FIG. 4 is an edge elevational view of one of the blades of the clamp.

Various types of power driven chain saws are now commonly used in production lumbering in which the saws are operated more or less constantly in the woods and at great distances from shops or other repair facilities. These chain saws include a chain loop trained around a thin backing plate and driven by a suitable motor to rotate the chain around the edges of the plate. Cutting teeth project from various lengths of the chain to cut a kerf in the logs or trees being sawed. These saw teeth require relatively frequent sharpening to keep the saws in efficient operating condition and due to the relatively bulky and heavy motors which drive the chains, it is very inconvenient to hold the saw in a fixed position for sharpening the teeth. The present invention provides a clamp by means of which the power driven saw and its backing plate and chain can be easily clamped in a fixed position for sharpening the teeth.

FIG. 1 illustrates one practical use of the clamp of the invention. A power driven saw including a motor body 1 with handles 2 and 3 and provided with a suitable source of power such as the internal combustion cylinder 4 is conventionally illustrated. A backing plate 5 projects from the body 1 and guidingly supports the driven chain loop 6 around which the chain is driven by the motor. Teeth 7 are conventionally illustrated projecting from the periphery of the chain loop.

The clamp generally indicated at 8 is engaged at its lower end in a semi-circular slot or kerf 9 cut in a fallen log 10. The kerf 9 is easily cut in the log or a conveniently located stump by means of the saw which is to be sharpened. The upper end of the clamp 8 rigidly grips the backing plate 5 while the body 1 and the principle weight of the saw rests on top of the log or stump.

As appears more clearly from FIGS. 2, 3 and 4, the clamp 8 consists of opposed clamp plates 11 and 12. For convenience and economy in manufacture these plates may be identical stampings of relatively heavy gauge sheet steel. Each plate includes a lower support engaging end 13 with a laterally outwardly extending offset bend 14 along its upper edge. Above the bend 14 the plates are provided with flat mid-sections 15 that are generally parallel to the lower support engaging ends 13 and project substantially thereabove.

At the upper ends of the mid-sections 15 there is formed a laterally inwardly extending bend or offset 16 which is of lesser lateral extent than the lateral lower bend 14. Projecting above the upper bends 16 are relatively narrow saw engaging clamp jaws 17 which in the at rest position of the plates are generally parallel to the lower support engaging ends 13 but spaced relatively outwardly from the planes thereof as is indicated by the reference line 18 in FIG. 4.

The two plates 11 and 12 of the clamp are brought together in opposed relation as illustrated and one plate 12 is pierced with a noncircular hole to nonrotatively receive and engage the neck of a clamp screw 19. The stem of the screw 19 projects freely through a hole 20 in the other plate 11 and a clamp nut 21 mounted on the outer end of the screw functions to draw the two plates together. Positioned slightly below the lower bend 14 and toward one side of the clamp plates is a small pin or rivet 22 which projects loosely through holes 23 provided therefor to prevent rotation of the plates about the screw 19 while permitting tilting motion of the plates toward and away from each other.

In operation the clamp nut 20 is loosened and the lower support engaging ends 13 are inserted into the pre-cut kerf 9 in generally parallel relation for easy entry into the kerf. The upper gripping jaws 17 are opened wide and the backing plate 5 is inserted between the jaws with the lower reach of the chain 6 received in the recess between the offset mid-sections of the plates. The clamp nut 21 is then tightened causing the plates to be drawn together and pivot about the opposed abutting inner edges of the lower bends 14. This motion simultaneously spreads the lower support engaging ends 13 so that they tightly grip the inside of the kerf 9 and at the same time draws the upper clamp jaws 17 together on opposite sides of the saw backing plate 5. By tightening the clamp nut 21 the clamp jaws 17 can be deflected slightly into parallel and tight clamping relation to the backing plate as illustrated in FIG. 3.

As was pointed out at the beginning of this description the main weight of the motor of the saw is supported on the log or support 10 while the clamp jaws 17 securely hold the plate 5 in fixed position so that the operator may have both hands free for sharpening the teeth 7. It will be noted that the chain loop 6 and teeth 7 can be rotated by hand while the saw is held in the clamp to progressively advance the several teeth to the most convenient position for sharpening.

The clamp is relatively small and light and inexpensive so that it can easily be carried by the saw operator at all times. By making the clamp nut 21 of the same size as nuts commonly employed on the saw 1, it is possible to utilize a single wrench for repairing and adjusting the saw and for tightening and loosening the clamp 8 as desired.

What is claimed as new is:

1. A clamp for holding chain saws comprising a pair of rectangular clamp plates having opposed flat support engaging lower ends with laterally outwardly and equally offset bends at their upper ends, chain embracing mid-sections extending upwardly from said bends and parallel to said lower ends, laterally inwardly turned bends at the upper ends of said mid-sections of lesser lateral extent than said first bends, upwardly extending clamping jaws on the ends of said second bends parallel to and offset laterally outwardly from said lower ends, a clamp screw extending through said mid-sections adjacent the lower ends thereof and having a non-rotating engagement with one of said plates, a clamp nut on the end of said clamp screw, and a rotation preventing pin extending loosely through said plates in spaced relation to said screw just below said first bends.

2. A clamp for holding chain saws comprising a pair of clamp plates having opposed flat support engaging lower ends with laterally outwardly and equally offset bends at their upper ends, chain embracing mid-sections extending upwardly from said bends and parallel to said lower ends, laterally inwardly turned bends at the upper ends of said mid-sections of lesser lateral extent than said first bends, upwardly extending clamping jaws on the ends of said second bends parallel to and offset laterally outwardly from said lower ends, a clamp screw extending through said mid-sections adjacent the lower ends thereof, a clamp nut on the end of said clamp screw, and a rotation preventing pin extending loosely through said plates in spaced relation to said screw.

3. A clamp for holding chain saws comprising a pair of clamp plates having opposed flat support engaging lower ends with laterally outwardly and equally offset bends at their upper ends, chain embracing mid-sections extending upwardly from said bends and parallel to said lower ends, laterally inwardly turned bends at the upper ends of said mid-sections, upwardly extending clamping jaws on the ends of said second bends parallel to said lower ends, a clamp screw extending through said mid-sections adjacent the lower ends thereof, a clamp nut on the end of said clamp screw, and a rotation preventing pin extending loosely through said plates in spaced relation to said screw.

4. A clamp for holding chain saws comprising a pair of clamp plates having opposed flat support engaging lower ends with laterally outwardly and equally offset bends at their upper ends, chain embracing mid-sections extending upwardly from said bends, laterally inwardly turned bends at the upper ends of said mid-sections, upwardly extending clamping jaws on the ends of said second bends, a clamp screw extending through said mid-sections adjacent the lower ends thereof, a clamp nut on the end of said clamp screw, and a rotation preventing pin engaged loosely between said plates in spaced relation to said screw.

5. A clamp for holding chain saws comprising a pair of clamp plates having opposed flat support engaging lower ends with laterally outwardly offset bends at their upper ends, chain embracing mid-sections extending upwardly from said bends, laterally inwardly turned bends at the upper ends of said mid-sections, upwardly extending clamping jaws on the ends of said second bends parallel to and offset laterally outwardly from said lower ends, a clamp screw extending through said mid-sections adjacent the lower ends thereof at equal distances on said plates from said offset bends whereby the plates are rockingly engaged at said bends and having a non-rotating engagement with one of said plates, and a clamp nut on the end of said clamp screw.

6. A clamp for holding chain saws comprising a pair of clamp plates having opposed flat support engaging lower ends with laterally outwardly offset bends at their upper ends, chain embracing mid-sections extending upwardly from said bends, laterally inwardly turned bends at the upper ends of said mid-sections, upwardly extending clamping jaws on the ends of said second bends, a clamp screw extending through said mid-sections at equal distances on said plates from said offset bends whereby the plates are rockingly engaged at said bends, and a clamp nut on the end of said clamp screw.

7. A clamp comprising a pair of clamp plates having opposed lower ends with laterally facing surfaces, chain embracing mid-sections projecting upwardly from said lower ends and spaced laterally from each other to form a horizontal line of pivotal engagement between the upper ends of said laterally facing surfaces, opposed work engaging jaws on the upper ends of said mid-sections, a clamp screw extending between the spaced portions of said mid-sections at equal distances on said plates from said line of pivotal engagement whereby the plates are rockingly engaged along the line, and a clamp nut on said screw arranged to draw said mid-sections together.

8. A clamp comprising a first plate having a lower support engaging portion, a mid-section and an upper work engaging jaw, a second plate having a lower support engaging portion, a mid-section and an upper work engaging jaw, all opposed to the corresponding parts of said first plate, the mid-section of one of said plates being offset laterally outwardly from the lower support engaging portion thereof to form a pivot edge between the connected lower support engaging portion and mid-section engageable with the other plate, and a clamp means engageable between said mid-sections of said plates at equal distances on said plates from said pivot edge above said pivot line.

References Cited in the file of this patent

UNITED STATES PATENTS

| | | |
|---|---|---|
| 311,241 | Flater | Jan. 27, 1885 |
| 573,737 | West | Dec. 22, 1896 |
| 1,180,422 | Paro | Apr. 25, 1916 |
| 1,410,512 | Ruppert | Mar. 21, 1922 |
| 2,469,527 | Stifflemire | May 10, 1949 |